United States Patent
Hou et al.

(10) Patent No.: US 11,537,222 B2
(45) Date of Patent: Dec. 27, 2022

(54) TOUCHPAD DEVICE AND MANUFACTURING METHOD THEREOF

(71) Applicant: Chicony Electronics Co., Ltd., New Taipei (TW)

(72) Inventors: Po-Chun Hou, New Taipei (TW); Po-Hsin Li, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/582,428

(22) Filed: Jan. 24, 2022

(65) Prior Publication Data
US 2022/0342496 A1    Oct. 27, 2022

(30) Foreign Application Priority Data
Apr. 22, 2021 (TW) ............................... 110114595

(51) Int. Cl.
*G06F 3/033* (2013.01)
*G06F 3/0354* (2013.01)

(52) U.S. Cl.
CPC .............................. *G06F 3/03547* (2013.01)

(58) Field of Classification Search
CPC ...... G06F 1/169; G06F 3/03547; G06F 3/041; G06F 2203/04103; G06F 2203/04105
See application file for complete search history.

(56) References Cited

U.S. PATENT DOCUMENTS

| | | | |
|---|---|---|---|
| 9,841,545 B2 * | 12/2017 | Mizutani | G02B 5/3033 |
| 10,725,567 B1 * | 7/2020 | Huang | G06F 1/1671 |
| 11,287,907 B1 * | 3/2022 | Li | G06F 3/03547 |
| 11,435,839 B2 * | 9/2022 | Li | G06F 3/03547 |
| 11,442,562 B2 * | 9/2022 | Li | G06F 3/03547 |
| 11,449,156 B1 * | 9/2022 | Li | G06F 3/03547 |
| 2013/0069890 A1 * | 3/2013 | Lee | G06F 3/0412 156/60 |
| 2014/0008113 A1 * | 1/2014 | Suh | G06F 3/041 174/257 |
| 2016/0077622 A1 * | 3/2016 | Lee | G06F 1/1684 345/173 |
| 2016/0124534 A1 * | 5/2016 | Ahn | B32B 17/06 345/173 |
| 2019/0384426 A1 * | 12/2019 | Huang | G06F 1/1616 |

FOREIGN PATENT DOCUMENTS

| | | |
|---|---|---|
| TW | M513405 U | 12/2015 |
| TW | 202006406 A | 2/2020 |

\* cited by examiner

*Primary Examiner* — Joe H Cheng
(74) *Attorney, Agent, or Firm* — Muncy, Geissler, Olds & Lowe, P.C.

(57) ABSTRACT

A touchpad device includes a substrate, a touch panel, and a light-curing adhesive film. The substrate includes a top surface, the touch panel is disposed above the top surface of the substrate, and the touch panel includes a touchpad and a circuit board stacked with each other. The light-curing adhesive film is bonded between the touch board and the circuit board, and the light-curing adhesive film is in a cured state.

14 Claims, 7 Drawing Sheets

TOUCHPAD DEVICE AND MANUFACTURING METHOD THEREOF

CROSS-REFERENCE TO RELATED APPLICATION

This non-provisional application claims priority under 35 U.S.C. § 119(a) to Patent Application No. 110114595 filed in Taiwan, R.O.C. on Apr. 22, 2021, the entire contents of which are hereby incorporated by reference.

BACKGROUND

Technical Field

The instant disclosure relates to an input device, in particular, to a touchpad device and manufacturing method thereof.

Related Art

Touchpads are common input devices widely applied in computers. The touchpad is provided for sensing the movement or pressing of a user's finger(s) to control the cursor to perform an action (e.g., to move, to click, or the like).

SUMMARY

A manufacturing method of touchpad device known to the inventor includes applying a liquid adhesive on a touch panel by an adhesive dispenser, attaching a circuit board to the adhesive, and then applying a high-temperature baking procedure to fix the touch panel with the circuit board by the adhesive.

However, in the manufacturing method, an additional adhesive dispenser is used to apply the liquid adhesive at a certain angle. As a result, the manufacturing process is time-consuming and inconvenient. Additionally, during attaching the circuit board to the liquid adhesive, overflow of adhesive may occur easily. Moreover, the applied liquid adhesive has a larger thickness (the thickness of the applied liquid adhesive is at least 0.15 mm) and uneven application of the liquid adhesive may occur easily. Furthermore, during the high-temperature baking procedure, bubbles may be formed in the liquid adhesive. Therefore, following issues are generated: unevenness of the touch panel, limitation in the reduction of the overall thickness of the touchpad device, adverse effect on the pressing feeling of the user, poorer rigidity of the component assembled by the touchpad and the circuit board, in which when the corner of the touch panel is pressed, the touch panel may have deflection or bending or may have an excessive idle stroke.

In view of this, in one embodiment, a manufacturing method of touchpad device is provided. The manufacturing method comprises providing a light-curing plate, wherein the light-curing plate comprises a first release sheet, a second release sheet, and a light-curing adhesive film stacked with each other, the light-curing adhesive film is in an uncured state and comprises a first surface and a second surface opposite to the first surface, the first release sheet is attached to the first surface, and the second release sheet is attached to the second surface; removing the first release sheet and attaching the first surface of the light-curing adhesive film to a surface of a touchpad; illuminating the light-curing adhesive film with a light emitted by a light-emitting element and removing the second release sheet; attaching a surface of a circuit board to the second surface of the light-curing adhesive film by a machine tool; and reacting the light-curing adhesive film from the uncured state to a cured state.

In another embodiment, a manufacturing method of touchpad device is provided. The manufacturing method comprises providing a light-curing plate, wherein the light-curing plate comprises a first release sheet, a second release sheet, and a light-curing adhesive film stacked with each other, the light-curing adhesive film is in an uncured state and comprises a first surface and a second surface opposite to the first surface, the first release sheet is attached to the first surface, and the second release sheet is attached to the second surface; removing the first release sheet and attaching the first surface of the light-curing adhesive film to a surface of a circuit board; illuminating the light-curing adhesive film with a light emitted by a light-emitting element and removing the second release sheet; attaching a surface of a touchpad to the second surface of the light-curing adhesive film by a machine tool; and reacting the light-curing adhesive film from the uncured state to a cured state.

In another embodiment, a touchpad device is provided. The touchpad device comprises a substrate, a touch panel, and a light-curing adhesive film. The substrate comprises a top surface, and the touch panel is disposed above the top surface of the substrate. The touch panel comprises a touchpad and a circuit board stacked with each other. The light-curing adhesive film is bonded between the touchpad and the circuit board, and the light-curing adhesive film is in a cured state.

Based on the above, according to the touchpad device and the manufacturing method of touchpad device of one or some embodiments of the instant disclosure, the touchpad and the circuit board are bonded with each other through the light-curing adhesive film. Therefore, as compared with the liquid adhesive known to the inventor, during the manufacturing process of the touchpad device according to one or some embodiments of the instant disclosure, additional adhesive dispenser is not applied and overflow of adhesive does not occur. Moreover, the light-curing adhesive film has a thinner thickness and a faster curing speed, and bubbles are not formed during the manufacturing process. Therefore, the component assembled by the touchpad and the circuit board has a better flatness and a reduced thickness. Moreover, the cured light-curing adhesive film can provide a better rigidity to prevent the touch panel to have deflection or bending or to have an excessive idle stroke upon the corner of the touch panel is pressed.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
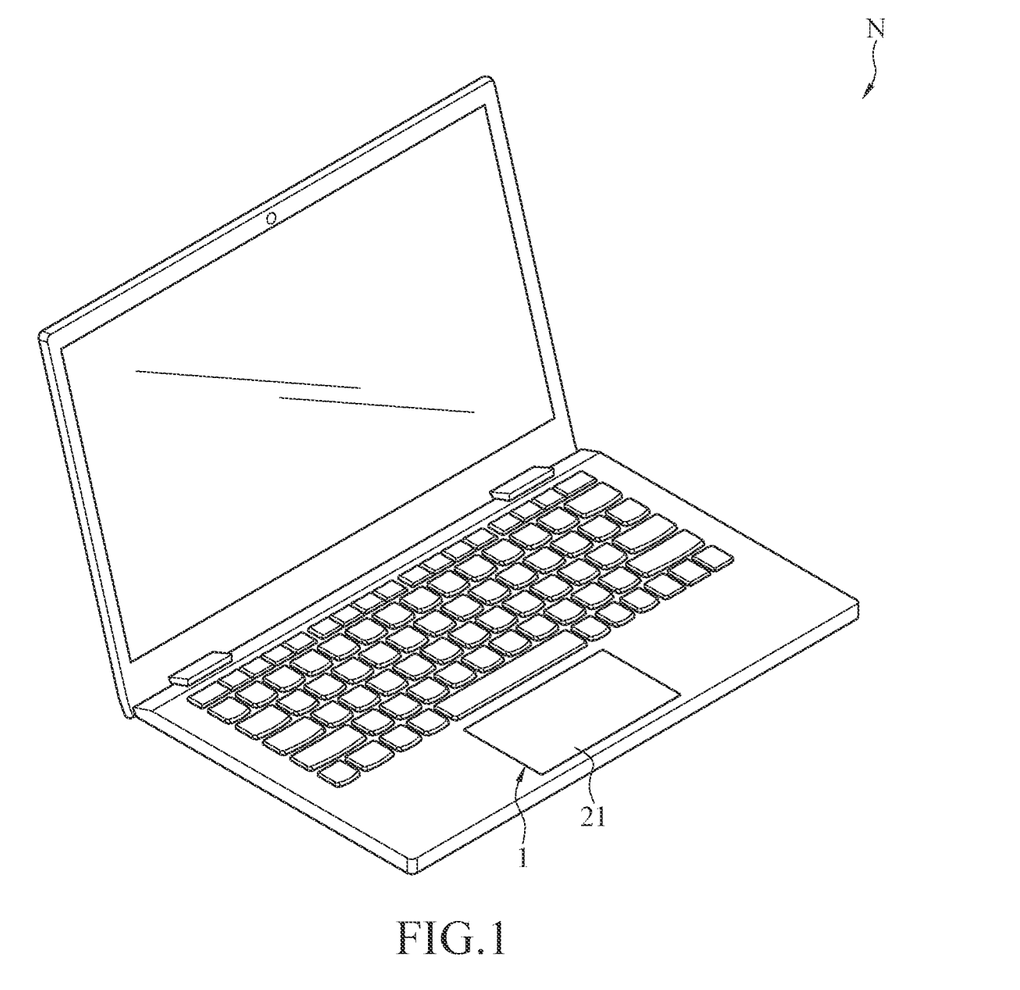
FIG. 1 illustrates a schematic application view of a touchpad device according to an exemplary embodiment of the instant disclosure.

FIG. 1 illustrates a schematic application view of a touchpad device according to an exemplary embodiment of the instant disclosure. As shown in FIG. 1, the touchpad device 1 may be applied in a computer product, and the user can operate the touchpad device 1 by sliding or pressing the touchpad device 1 with the user's finger(s) so as to control the movement of the cursor or to generate corresponding control signal(s). For example, in this embodiment, the touchpad device 1 is applied in a notebook computer N, but embodiments are not limited thereto. In some embodiments, the touchpad device 1 may be applied in other portable computers (e.g., tablet computers). Alternatively, the touchpad device 1 may be an individual device and may be capable of externally connected to a portable computer, but embodiments are not limited thereto.

Figure 2:
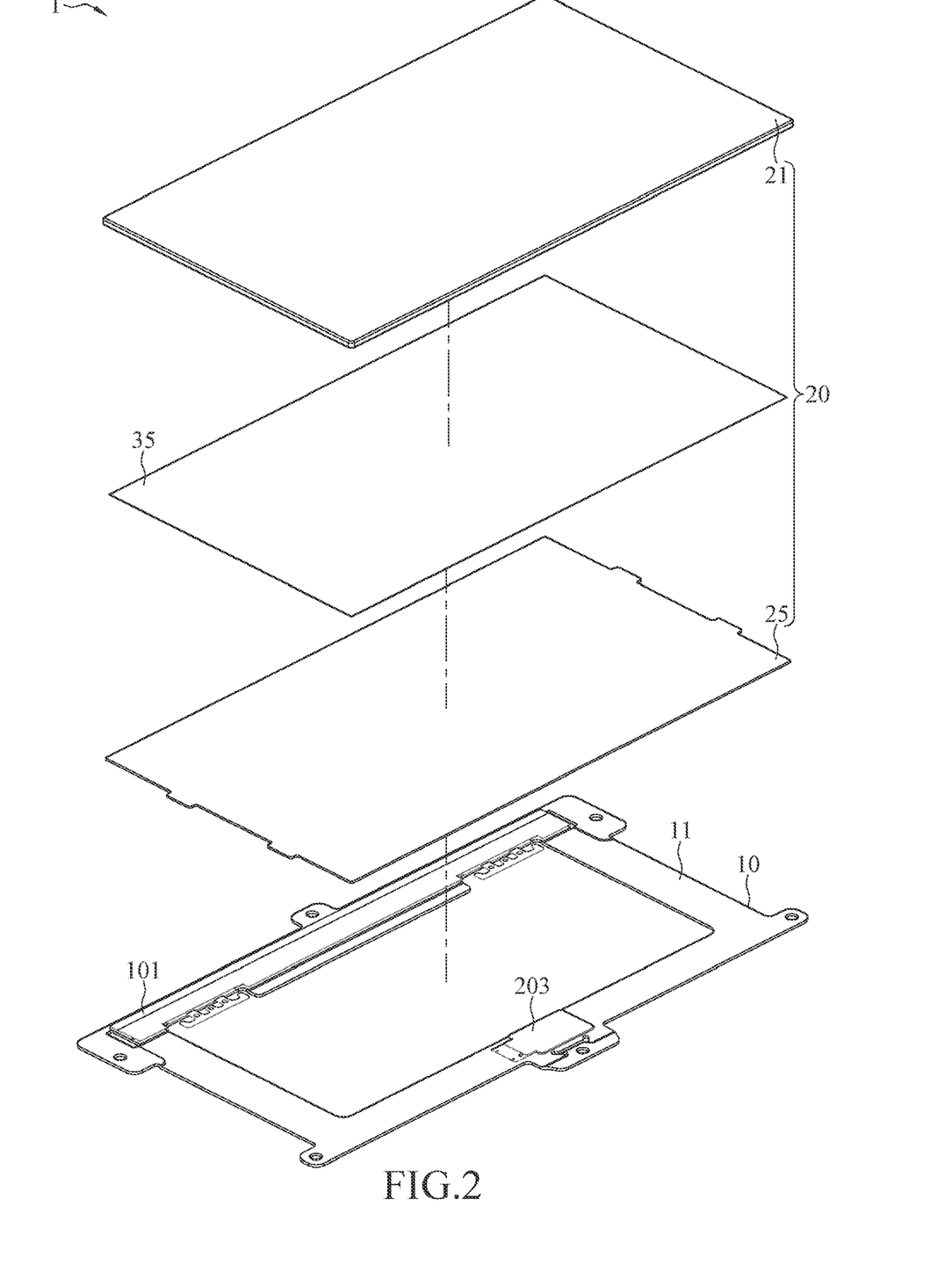
FIG. 2 illustrates an exploded view of the touchpad device of the exemplary embodiment.
Figure 3:
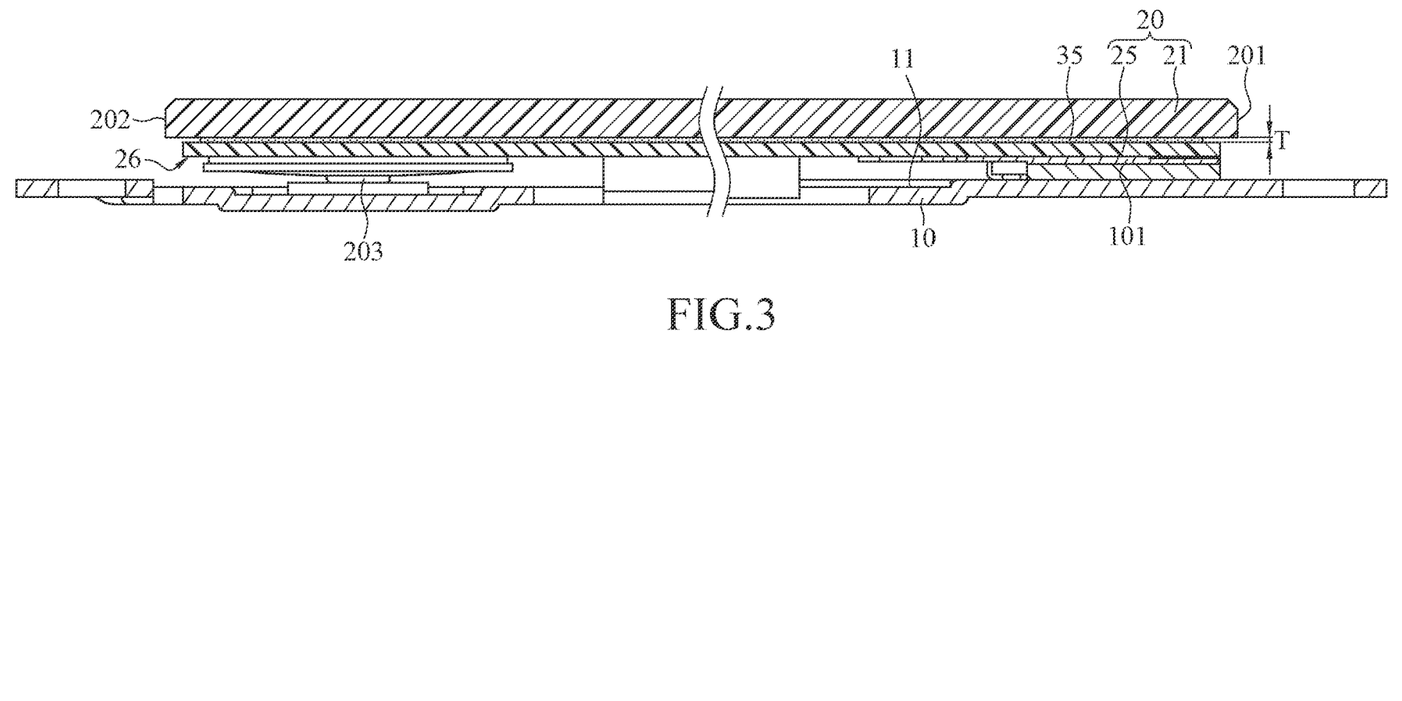
FIG. 3 illustrates a cross-sectional view of the touchpad device of the exemplary embodiment.

FIG. 2 illustrates an exploded view of the touchpad device of the exemplary embodiment. FIG. 3 illustrates a cross-sectional view of the touchpad device of the exemplary embodiment. As shown in FIGS. 2 and 3, the touchpad device 1 comprises a substrate 10, a touch panel 20, and a light-curing adhesive film 35. The substrate 10 may be a rigid plate made of metal (e.g., iron, aluminum, alloy, etc.), or plastic material. In this embodiment, the substrate 10 is at the bottommost layer of the touchpad device 1 and has a top surface 11, and the touch panel 20 is disposed above the top surface 11.

As shown in FIGS. 2 and 3, the touch panel 20 comprises a touchpad 21 and a circuit board 25 stacked with each other, and the circuit board 25 is between the substrate 10 and the touchpad 21. The touchpad 21 is provided for being touched or pressed by the user. For example, the circuit board 25 may perform functions such as scrolling, zooming in, zooming out, opening window, or the like in response to the movement or the gesture of the user's finger(s) on the touchpad 21. Alternatively, in some embodiments, the circuit board 25 may perform functions such as selecting, displaying menu, or the like in response to the click or double click of the user's finger(s) on the touchpad 21.

In some embodiments, the touchpad 21 may be a plate made of glass or polyester resin (mylar).

As shown in FIGS. 2 and 3, the circuit board 25 has a bottom surface 26, and the bottom surface 26 faces the top surface 11 of the substrate 10. In this embodiment, a pressable trigger switch 203 is disposed between the bottom surface 26 of the circuit board 25 of the touch panel 20 and the substrate 10. For example, the pressable trigger switch 203 may be a button switch or a microswitch. Moreover, the pressable trigger switch 203 makes the touch panel 20 be kept at a height position so as to keep spaced apart from the substrate 10. Therefore, when the touch panel 20 is pressed so as to be moved downwardly with respect to the substrate 10, the pressable trigger switch 203 is pressed and triggered to generate signal(s). When the touch panel 20 is released, the touch panel 20 is moved resiliently to the height position with the elastic force stored in the pressable trigger switch 203.

In some embodiments, the circuit board 25 may be a printed circuit board (PCB), a flexible printed circuit board (FPCB), or a Rigid-Flex PCB.

As shown in FIGS. 2 and 3, the touch panel 20 comprises a pivot side 201 pivotally disposed on one side of the substrate 10. Therefore, when the touch panel 20 is pressed, the touch panel 20 can swing to move downwardly with respect to the substrate 10. In this embodiment, an elongated block 101 is fixedly disposed on one side of the substrate 10 adjacent to the pivot side 201, and the pivot side 201 of the touch panel 20 may be fixed (e.g., by adhering, engaging, or locking) on the elongated block 101, so that the touch panel 20 can swing with respect to the substrate 10 by taking the pivot side 201 as the swing center. Moreover, in this embodiment, the touch panel 20 comprises a swing side 202 opposite to the pivot side 201, and the pressable trigger switch 203 is disposed between the swing side 202 and the substrate 10.

In some embodiments, the elongated block 101 may be a block made of soft materials such as sponge, rubber, or silicone rubber. Therefore, the elongated block 101 can absorb the deformation of the touch panel 20 or the deformation of the substrate 10 upon operation, thus allowing the touchpad device 1 to provide better operation feelings. Alternatively, in some embodiments, the elongated block 101 may be a rigid block made of plastic (e.g., polycarbonate or polyethylene terephthalate) or metal, so that the rigidity of the substrate 10 and the rigidity of the component assembled by the touch panel 20 and the substrate 10 can be enhanced. Moreover, the elongated block 101 made of metal may be fixed with the touch panel 20 or the substrate 10 by welding or riveting.

In some embodiments, the pivot side 201 of the touch panel 20 may be pivotally connected to one side of the substrate 10 through other manners, and the pressable trigger switch 203 may be disposed at other portions that are between the pivot side 201 and the swing side 202.

As shown in FIGS. 2 and 3, the light-curing adhesive film 35 is bonded between the touchpad 21 and the circuit board 25, and the light-curing adhesive film 35 is in a cured state. The light-curing adhesive film 35 is a film with a certain shape. For example, the shape of the light-curing adhesive film 35 may be the same as the shape of the touchpad 21. The light-curing adhesive film 35 is illuminated by a certain light to be reacted from an uncured state to the cured state. Therefore, the light-curing adhesive film 35 in the cured state can provide a better rigidity. Hence, when the corner of the touch panel 20 is pressed, the touch panel 20 can be prevented from having deflection or bending or having an excessive idle stroke. Moreover, as compared with the liquid adhesive used in the method known to the inventor, during the manufacturing process of the touchpad device 1 according to one or some embodiments of the instant disclosure, additional adhesive dispenser is not applied and overflow of adhesive does not occur. Moreover, the light-curing adhesive film 35 has a thinner thickness (e.g., the thickness of the light-curing adhesive film may be between 0.03 mm and 0.05 mm) and a faster curing speed, and bubbles are not formed during the manufacturing process. Therefore, the component assembled by the touchpad 21 and the circuit board 25 have a proper flatness and a reduced thickness so as to provide better pressing feelings. Detailed descriptions are provided as below.

Figure 4:
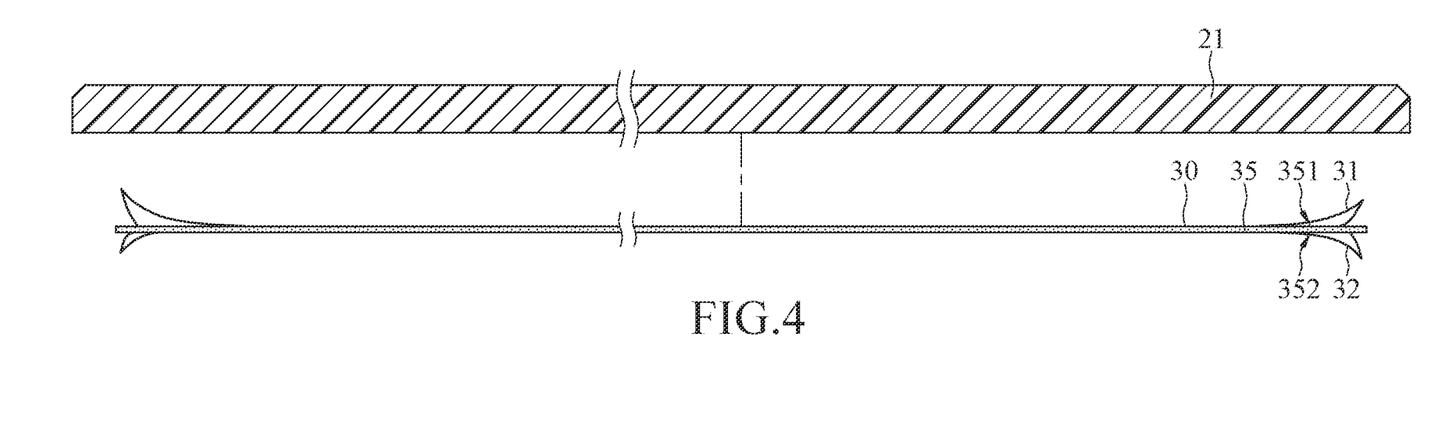
FIG. 4 illustrates a schematic view showing the manufacturing process of the touchpad device of the exemplary embodiment.
Figure 5:
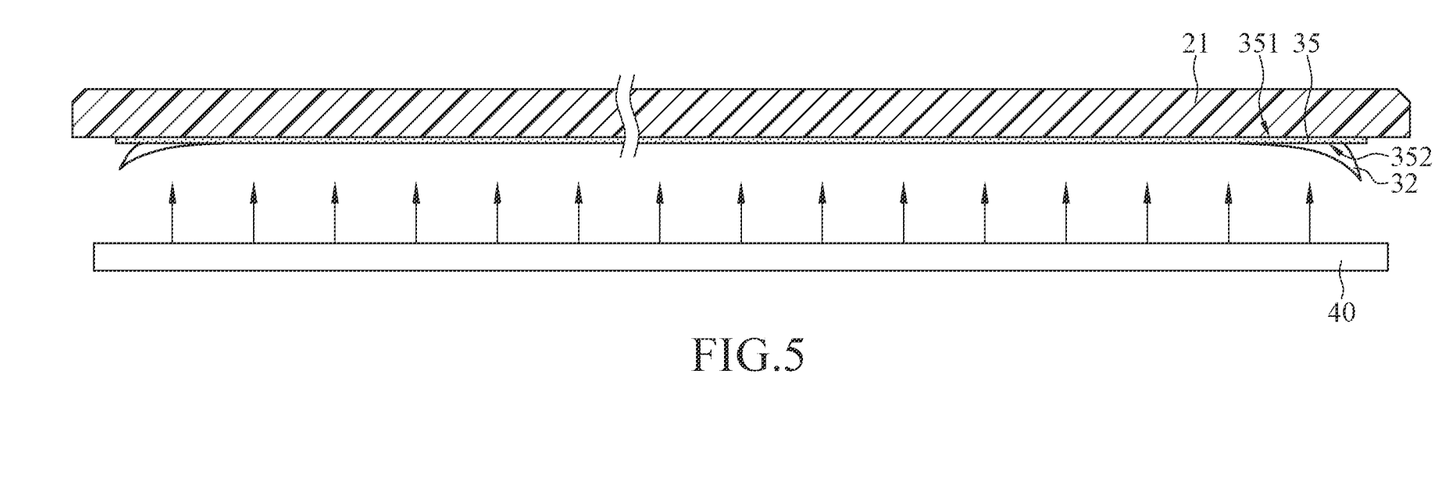
FIG. 5 illustrates a schematic view following FIG. 4.
Figure 6:
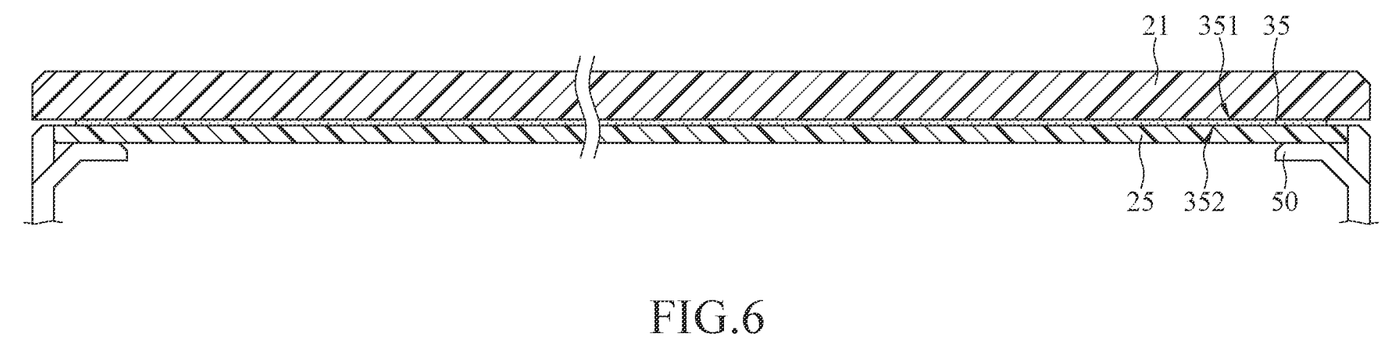
FIG. 6 illustrates a schematic view following FIG. 5.

FIG. 4 illustrates a schematic view showing the manufacturing process of the touchpad device of the exemplary embodiment. FIG. 5 illustrates a schematic view following FIG. 4. FIG. 6 illustrates a schematic view following FIG. 5.

Figure 7:
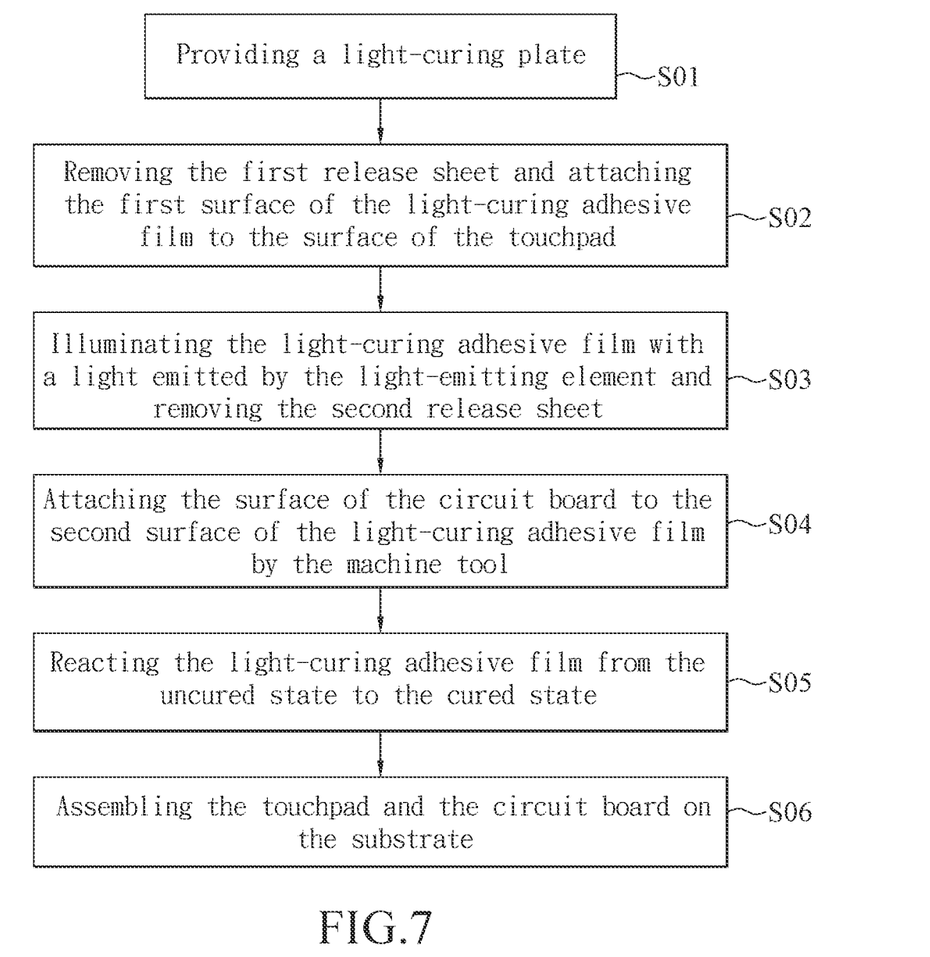
FIG. 7 illustrates a flowchart of a manufacturing method of touchpad device according to an exemplary embodiment of the instant disclosure.

FIG. 7 illustrates a flowchart of a manufacturing method of touchpad device according to an exemplary embodiment of the instant disclosure. It should be noted that, the components mentioned in the process and method may be referred to the embodiments shown in FIGS. 2 to 6, but embodiments are not limited thereto.

As shown in FIG. 7, in the step S01, a light-curing plate 30 is provided. Please refer to FIG. 4, the light-curing plate 30 comprises a first release sheet 31, a second release sheet 32, and a light-curing adhesive film 35 stacked with each other. The light-curing adhesive film 35 is in an uncured state and comprises a first surface 351 and a second surface 352 opposite to the first surface 351. The first release sheet 31 is attached to the first surface 351, and the second release sheet 32 is attached to the second surface 352.

As above, specifically, in some embodiments, the light-curing adhesive film 35 is a film with a certain shape (in this embodiment, the light-curing adhesive film 35 is a rectangular film), and the light-curing adhesive film 35 contains photoinitiator or photosensitizer. The photoinitiator or the photosensitizer may be reacted upon being illuminated by a certain light (e.g., ultraviolet (UV) light, infrared light, or visible light), so that the entire light-curing adhesive film 35 is cured to be in the solid state. The uncured state indicates that the photoinitiator or the photosensitizer of the light-curing adhesive film 35 is not illuminated by the certain light and thus is not reacted and cured. For example, the light-curing adhesive film 35 may be a UV light-curing adhesive film, and the light-curing adhesive film 35 is reacted from the uncured state to the cured state when the light-curing adhesive film 35 is illuminated by the UV light. In other embodiments, the light-curing adhesive film 35 may be an infrared light-curing adhesive film or a visible light-curing adhesive film, but embodiments are no limited thereto.

Further, as shown in FIG. 4, in one or some embodiments of the instant disclosure, the first release sheet 31 is attached to the first surface 351 of the light-curing adhesive film 35 and the second release sheet 32 is attached to the second surface 352 of the light-curing adhesive sheet 35. Therefore, the whole light-curing plate 30 can provide a better rigidity. Hence, during the manufacturing process, the light-curing plate 30 can be moved or taken for assembling procedures in a convenient manner. Furthermore, the release sheets of the light-curing plate 30 also prevent the light-curing adhesive film 35 from contacting external substances and attaching substances (such as dusts or debris). In some embodiments, the first release sheet 31 and the second release sheet 32 may be transparent sheet or an opaque sheet, depending on the manufacturing processes, and detail descriptions are provided as below.

As shown in FIG. 7, after the step S01, the step S02 is executed: removing the first release sheet 31 and attaching the first surface 351 of the light-curing adhesive film 35 to the surface of the touchpad 21. For example, please refer to FIG. 4, in the step S02, the first release sheet 31 can be teared from the first surface 351 of the light-curing adhesive film 35 by a stripping machine, and then the first surface 351 of the light-curing adhesive film 35 is attached to the surface of the touchpad 21 by a processing machine (as shown in FIG. 5), so that the light-curing adhesive film 35 and the touchpad 21 are bonded with each other. Moreover, in the step S02, since the entire light-curing plate 30 has a certain rigidity and the light-curing adhesive film 35 is a film with a certain shape, the first surface 351 of the light-curing adhesive film 35 of the light-curing plate 30 can be attached to the surface of the touchpad 21 rapidly. Therefore, as compared with the liquid adhesive method (applied by dispenser) known to the inventor, in the method according to one or some embodiments of the instant disclosure, the manufacturing process can be greatly simplified, the manufacturing cost can be greatly reduced, and overflow of adhesive does not occur.

As shown in FIG. 7, after the step S02, the step S03 is executed: illuminating the light-curing adhesive film 35 with a light emitted by a light-emitting element 40 and removing the second release sheet 32. Please refer to FIG. 5, before the step S03, the light-curing adhesive film 35 is in the uncured state. In the step S03, the light-emitting element 40 is used to emit light to illuminate the light-curing adhesive film 35 uniformly. For example, in the case that the light-curing adhesive film 35 is a UV light-curing adhesive film, the light emitted by the light-emitting element 40 is a UV light, and the photoinitiator or the photosensitizer in the light-curing adhesive film 35 is illuminated by the light to have reaction.

As shown in FIG. 7, after the step S03, the step S04 is executed: attaching the surface of the circuit board 25 to the second surface 352 of the light-curing adhesive film 35 by a machine tool 50. The step S03 and the step S04 may be implemented by at least following two implementations. As shown in FIG. 5, in one implementation, in the step S03, the second release sheet 32 is removed from the second surface 352 of the light-curing adhesive film 35 by the stripping machine, and then the light-emitting element 40 emits light to illuminate the light-curing adhesive film 35 directly. Then, as shown in FIG. 6, before the light-curing adhesive film 35 is reacted to be in the cured state, the surface of the circuit board 25 is attached to, by a machine tool 50 (e.g., a robot arm), the second surface 352 of the light-curing adhesive film 35 rapidly (namely, the step S04). In this implementation, after the light-emitting element 40 emits light to illuminate the light-curing adhesive film 35, the circuit board 25 can be directly attached to the second surface 352 of the light-curing adhesive film 35 without waiting the removing of the second release sheet 32. Therefore, the advantages in this implementation are that, the circuit board 25 is prone to be attached to the light-curing adhesive film 35 easily before the light-curing adhesive film 35 is cured. Moreover, in this implementation, the second release sheet 32 is not limited to be the transparent sheet or the opaque sheet.

In another implementation, in the step S03, firstly the light-emitting element 40 emits light to illuminate the second release sheet 32 and the light-curing adhesive film 35, so that the light passes through the second release sheet 32 to illuminate the light-curing adhesive film 35, and then the second release sheet 32 is removed from the second surface 352 of the light-curing adhesive film 35 by the stripping machine. Next, before, the light-curing adhesive film 35 is reacted to be in the cured state, the surface of the circuit board 25 is attached to the second surface 352 of the light-curing adhesive film 35 quickly (namely, the step S04). Therefore, the advantage in this implementation is that, during the light-emitting element 40 emits light to illuminate the light-curing adhesive film 35, the second release sheet 32 is still attached to the light-curing adhesive film 35 to prevent the light-curing adhesive film 35 from contacting external substances and attaching substances such as dusts or debris. Moreover, in this implementation, the second release sheet 32 should be the transparent sheet to allow the light to pass therethrough.

In the step S04, after the surface of the circuit board 25 is attached to the second surface 352 of the light-curing adhesive film 35 by the machine tool 50, the machine tool 50 may further apply pressure to the circuit board 25, such that the circuit board 25 presses the second surface 352 of the light-curing adhesive film 35 and a better bonding performance can be provided.

Further, as shown in FIG. 7, after the step S04, the step S05 is executed: reacting the light-curing adhesive film 35 from the uncured state to the cured state. For example, upon the light-curing adhesive film 35 is illuminated by the light, the light-curing adhesive film 35 is placed for 1 to 3 seconds and then the light-curing adhesive film 35 can be automatically reacted from the uncured state to the cured state, such that the touchpad 21 and the circuit board 25 can be bonded with each other to form the touch panel 20. Accordingly, as compared to the method known to the inventor in which the liquid adhesive is applied by the dispenser and a baking procedure is followed after the adhesive application, in one or some embodiments of the instant disclosure, the light-curing adhesive film 35 can be cured quickly (the light-curing adhesive film 35 can be cured within 3 seconds) without the formation of bubbles. Therefore, the component assembled by the touchpad 21 and the circuit board 25 can have a proper flatness so as to provide better pressing feelings. Moreover, the light-curing adhesive film 35 which is cured to be in the solid state can provide a better rigidity. Therefore, when the corner of the touch panel 20 is pressed, issues for the touch panel 20 such as deflection, bending, or having an excessive idle stroke can be prevented.

In some embodiments, the light-curing adhesive film 35 may be a UV light-curing adhesive film, the light emitted by the light-emitting element 40 is the UV light, and the wavelength of the UV light is between 320 nm and 400 nm (long-wavelength UV light). The long-wavelength UV light has lower heats. Therefore, during the manufacturing process, the long-wavelength UV light does not burn human's skin easily thereby improving the safety of the manufacturing process. Moreover, the long-wavelength UV light has a stronger penetration effect, thereby improving the curing strength of the cured light-curing adhesive film 35. Hence, the bonding between the touchpad 21 and the circuit board 25 is stronger and the rigidity of the touch panel 20 can be improved. Accordingly, when the corner of the touch panel 20 is pressed, issues for the touch panel 20 such as deflection, bending, or having an excessive idle stroke can be prevented.

Further, as shown in FIG. 7, after the step S05, the step S06 is executed: assembling the touchpad 21 and the circuit board 25 on the substrate 10. Please refer to FIG. 3, the touchpad 21 and the circuit board 25 can be bonded with each other by the light-curing adhesive film 35 to form the touch panel 20, and the pivot side 201 of the touch panel 20 can be assembled to the elongated block 101 of the substrate 10 by adhering, engaging, or locking, so that the touch panel 20 is swingably assembled above the substrate 10.

Figure 8:
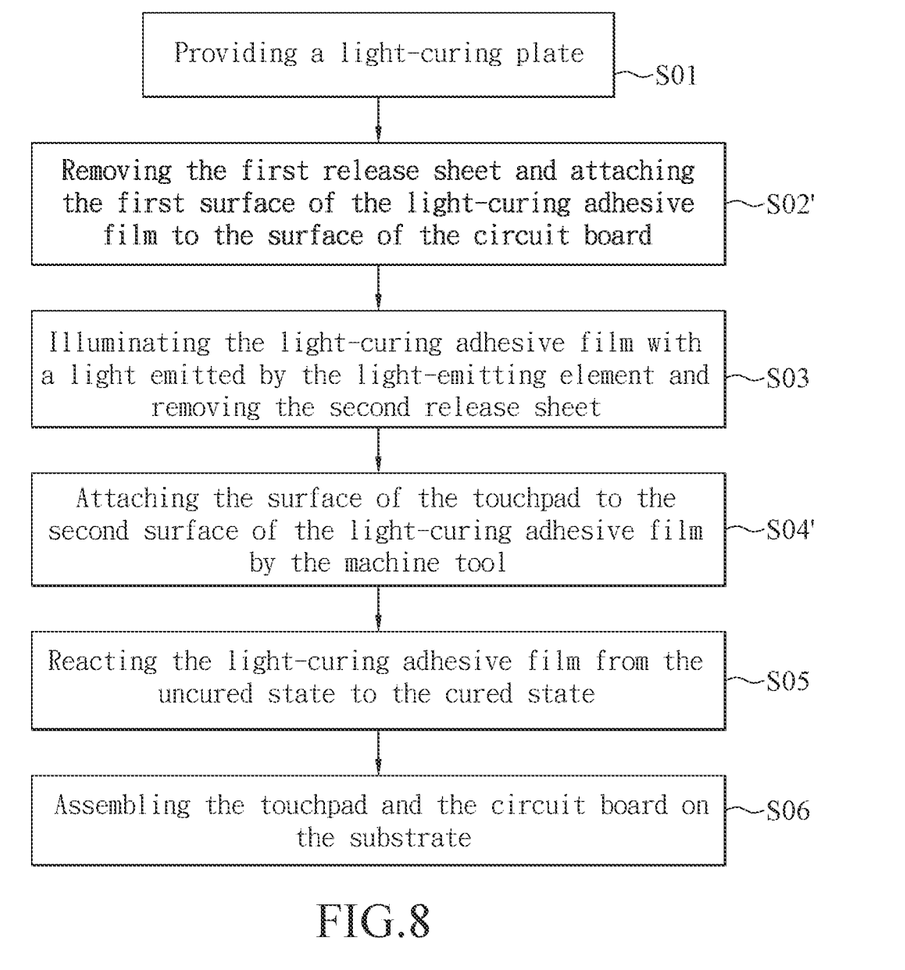
FIG. 8 illustrates a flowchart of a manufacturing method of touchpad device according to another exemplary embodiment of the instant disclosure.

FIG. 8 illustrates a flowchart of a manufacturing method of touchpad device according to another exemplary embodiment of the instant disclosure. As shown in FIG. 8, the difference between the embodiment of FIG. 8 and the embodiment in FIG. 7 is that, in this embodiment, after the step S01, the step S02' is executed: removing the first release sheet 31 and attaching the first surface 351 of the light-curing adhesive film 35 to the surface of the circuit board 25, and after the step S03, the step S04' is executed: attaching the surface of the touchpad 21 to the second surface 352 of the light-curing adhesive film 35 by a machine tool 50. In other words, in this embodiment of the manufacturing method of touchpad device, firstly the first surface 351 of the light-curing adhesive film 35 is attached to the surface of the circuit board 25, and the light-curing adhesive film 35 is illuminated by the light, and then the surface of the touchpad 21 is attached to the second surface 352 of the light-curing adhesive film 35.

Based on the above, according to the touchpad device and the manufacturing method of touchpad device of one or some embodiments of the instant disclosure, the touchpad and the circuit board are bonded with each other through the light-curing adhesive film. Therefore, as compared with the liquid adhesive known to the inventor, during the manufacturing process of the touchpad device according to one or some embodiments of the instant disclosure, additional adhesive dispenser is not applied and overflow of adhesive does not occur. Moreover, the light-curing adhesive film has a thinner thickness and a faster curing speed, and bubbles are not formed during the manufacturing process. Therefore, the component assembled by the touchpad and the circuit board has a better flatness and a reduced thickness. Moreover, the cured light-curing adhesive film can provide a better rigidity to prevent the touch panel to have deflection or bending or to have an excessive idle stroke upon the corner of the touch panel is pressed.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A manufacturing method of touchpad device, comprising:
   (a) providing a light-curing plate, wherein the light-curing plate comprises a first release sheet, a second release sheet, and a light-curing adhesive film stacked with each other; the light-curing adhesive film is in an uncured state and comprises a first surface and a second surface opposite to the first surface, the first release sheet is attached to the first surface, and the second release sheet is attached to the second surface;
   (b) removing the first release sheet and attaching the first surface of the light-curing adhesive film to a surface of a touchpad;
   (c) illuminating the light-curing adhesive film with a light emitted by a light-emitting element and removing the second release sheet;
   (d) attaching a surface of a circuit board to the second surface of the light-curing adhesive film by a machine tool; and
   (e) reacting the light-curing adhesive film from the uncured state to a cured state.

2. The manufacturing method according to claim 1, wherein in the step (c), the light-curing adhesive film is illuminated with the light emitted by the light-emitting element after the second release sheet is removed.

3. The manufacturing method according to claim 1, wherein in the step (c), the second release sheet is a transparent release sheet, and the light-curing adhesive film is illuminated with the light emitted by the light-emitting element after the second release sheet is removed.

4. The manufacturing method according to claim 1, wherein in the step (c), the light emitted by the light-emitting element is a UV light, and a wavelength of the light is between 320 nm and 400 nm.

5. The manufacturing method according to claim 1, wherein after the step (e), the manufacturing method further comprises: assembling the touchpad and the circuit board on a substrate.

6. A manufacturing method of touchpad device, comprising:
- (a) providing a light-curing plate, wherein the light-curing plate comprises a first release sheet, a second release sheet, and a light-curing adhesive film stacked with each other; the light-curing adhesive film is in an uncured state and comprises a first surface and a second surface opposite to the first surface, the first release sheet is attached to the first surface, and the second release sheet is attached to the second surface;
- (b) removing the first release sheet and attaching the first surface of the light-curing adhesive film to a surface of a circuit board;
- (c) illuminating the light-curing adhesive film with a light emitted by a light-emitting element and removing the second release sheet;
- (d) attaching a surface of a touchpad to the second surface of the light-curing adhesive film by a machine tool; and
- (e) reacting the light-curing adhesive film from the uncured state to a cured state.

7. The manufacturing method according to claim 6, wherein in the step (c), the light-curing adhesive film is illuminated with the light emitted by the light-emitting element after the second release sheet is removed.

8. The manufacturing method according to claim 6, wherein in the step (c), the second release sheet is a transparent release sheet, and the light-curing adhesive film is illuminated with the light emitted by the light-emitting element after the second release sheet is removed.

9. The manufacturing method according to claim 6, wherein in the step (c), the light emitted by the light-emitting element is a UV light, and a wavelength of the light is between 320 nm and 400 nm.

10. The manufacturing method according to claim 6, wherein after the step (e), the manufacturing method further comprises: assembling the touchpad and the circuit board on a substrate.

11. A touchpad device, comprising:
- a substrate comprising a top surface;
- a touch panel disposed above the top surface of the substrate, wherein the touch panel comprises a touchpad and a circuit board stacked with each other; and
- a light-curing adhesive film bonded between the touchpad and the circuit board, wherein the light-curing adhesive film is in a cured state.

12. The touchpad device according to claim 11, wherein the touch panel comprises a pivot side, and the pivot side is pivotally connected to one side of the substrate.

13. The touchpad device according to claim 12, wherein the touch panel comprises a swing side opposite to the pivot side, and a pressable trigger switch is disposed between the swing side and the substrate.

14. The touchpad device according to claim 11, wherein a thickness of the light-curing adhesive film is between 0.03 mm and 0.05 mm.

\* \* \* \* \*